(12) United States Patent
von der Embse

(10) Patent No.: US 7,394,792 B1
(45) Date of Patent: Jul. 1, 2008

(54) MULTI-SCALE CDMA

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 1047 days.

(21) Appl. No.: 10/266,257

(22) Filed: Oct. 8, 2002

(51) Int. Cl.
H04B 7/216 (2006.01)
(52) U.S. Cl. ........................ 370/335; 370/342
(58) Field of Classification Search ................ 370/342, 370/441, 341, 208, 209, 210, 320, 335; 375/131, 375/132, 133, 134, 135, 140, 141
See application file for complete search history.

(56) References Cited

U.S. PATENT DOCUMENTS

| | | | |
|---|---|---|---|
| 5,103,459 A | | 4/1992 | Gilhousen et al. |
| 5,159,608 A | * | 10/1992 | Falconer et al. ............. 375/130 |
| 5,311,176 A | | 5/1994 | Gurney |
| 5,442,625 A | | 8/1995 | Gitlin et al. |
| 5,583,892 A | | 12/1996 | Drakul et al. |
| 5,715,236 A | | 2/1998 | Gilhousen et al. |
| 5,790,570 A | | 8/1998 | Heegard et al. |
| 5,805,567 A | | 9/1998 | Ramesh |
| 5,848,105 A | | 12/1998 | Gardner et al. |
| 5,862,453 A | | 1/1999 | Love et al. |
| 5,943,361 A | | 8/1999 | Gilhousen et al. |
| 5,946,344 A | | 8/1999 | Warren et al. |
| 5,956,345 A | | 9/1999 | Allpress et al. |
| 6,088,347 A | | 7/2000 | Minn et al. |
| 6,157,611 A | | 12/2000 | Shanbhag |
| 6,160,854 A | | 12/2000 | Heegard et al. |
| 6,167,079 A | | 12/2000 | Kinnunen et al. |
| 6,185,246 B1 | | 2/2001 | Gilhousen et al. |
| 6,239,767 B1 | | 5/2001 | Rossi et al. |
| 6,308,294 B1 | | 10/2001 | Ghosh et al. |
| 6,317,413 B1 | | 11/2001 | Honkasalo |
| 6,317,466 B1 | | 11/2001 | Fuschini et al. |
| 6,351,832 B1 | | 2/2002 | Wei |
| 6,353,638 B1 | | 3/2002 | Hottinen et al. |
| 6,356,528 B1 | | 3/2002 | Lundby et al. |
| 6,362,781 B1 | | 3/2002 | Thomas et al. |
| 6,366,624 B1 | | 4/2002 | Balachandran et al. |
| 6,389,138 B1 | | 5/2002 | Li et al. |

(Continued)

OTHER PUBLICATIONS

U.S. Appl. No. 09/846,410, filed Feb. 2001, Urbain von der Embse.

(Continued)

Primary Examiner—Melvin Marcelo
Assistant Examiner—Farah Faroul

(57) ABSTRACT

Method for reducing the chip rate of Code Division Multiple Access (CDMA) codes uniformly spread over a frequency bandwidth by converting these codes to 2-scale codes which perform uniform spreading within the subbands of a filter bank over the bandwidth, and over the subbands, and with controllable subband power levels. This is a 2-scale code example of Multi-Scale Code Division Multiple Access (MS-CDMA) and assigns algebraic fields of indices for the first scale "0" which spread within each subband and algebraic fields of indices for the second scale "1" which spread over the subbands. These algebraic fields are scaled and combined to form the algebraic fields of code and chip indices for the 2-scale code. These 2-scale codes perform a Wavelet dilation type of operation to stretch the CDMA chips while maintaining the spreading over the full frequency band.

6 Claims, 7 Drawing Sheets

U.S. PATENT DOCUMENTS

| | | |
|---|---|---|
| 6,393,012 B1 | 5/2002 | Pankaj et al. |
| 6,396,423 B1 | 5/2002 | Laumen et al. |
| 6,396,804 B2 | 5/2002 | Oldenwalder |
| 6,396,826 B1 * | 5/2002 | Ohlson et al. ............... 370/342 |
| 6,430,722 B1 | 8/2002 | Eroz et al. |
| 6,885,652 B1 * | 4/2005 | Ozukturk et al. ............ 370/342 |
| 7,095,709 B2 * | 8/2006 | Walton et al. ............... 370/208 |
| 7,242,721 B2 * | 7/2007 | Alard et al. ................. 375/260 |
| 7,245,599 B2 * | 7/2007 | Feria et al. .................. 370/335 |
| 7,277,382 B1 * | 10/2007 | von der Embse ............ 370/209 |
| 2002/0126741 A1 | 9/2002 | Baum et al. |
| 2002/0136276 A1 * | 9/2002 | Franceschini et al. ....... 375/148 |

OTHER PUBLICATIONS

U.S. Appl. No. 09/826,118, filed Jan. 2001, Urbain von der Embse.
U.S. Appl. No. 09/826,117, filed Jan. 2001, Urbain von der Embse.

* cited by examiner

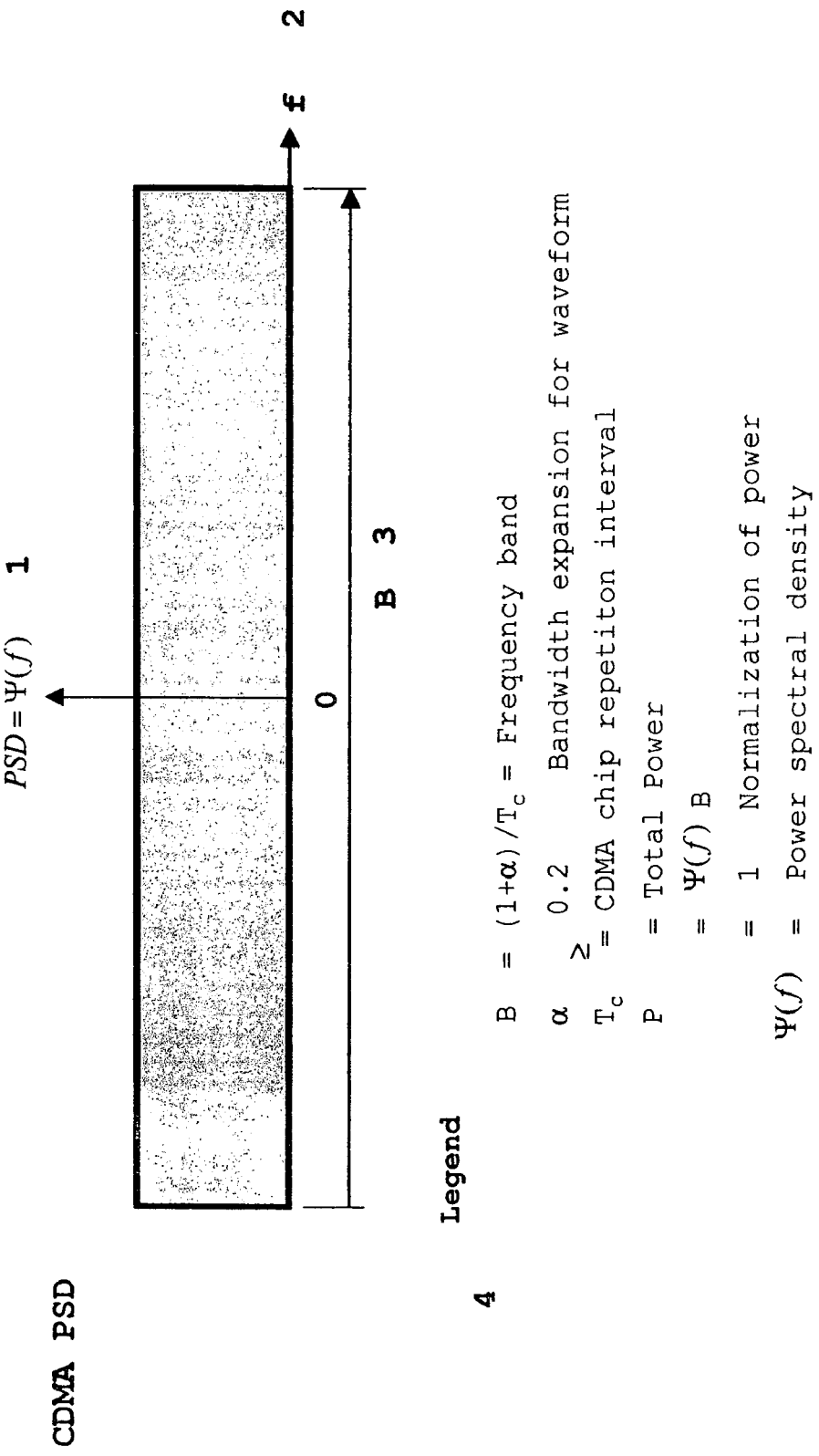
FIG. 1 Prior Art: CDMA Baseband Power Spectral Density (PSD)

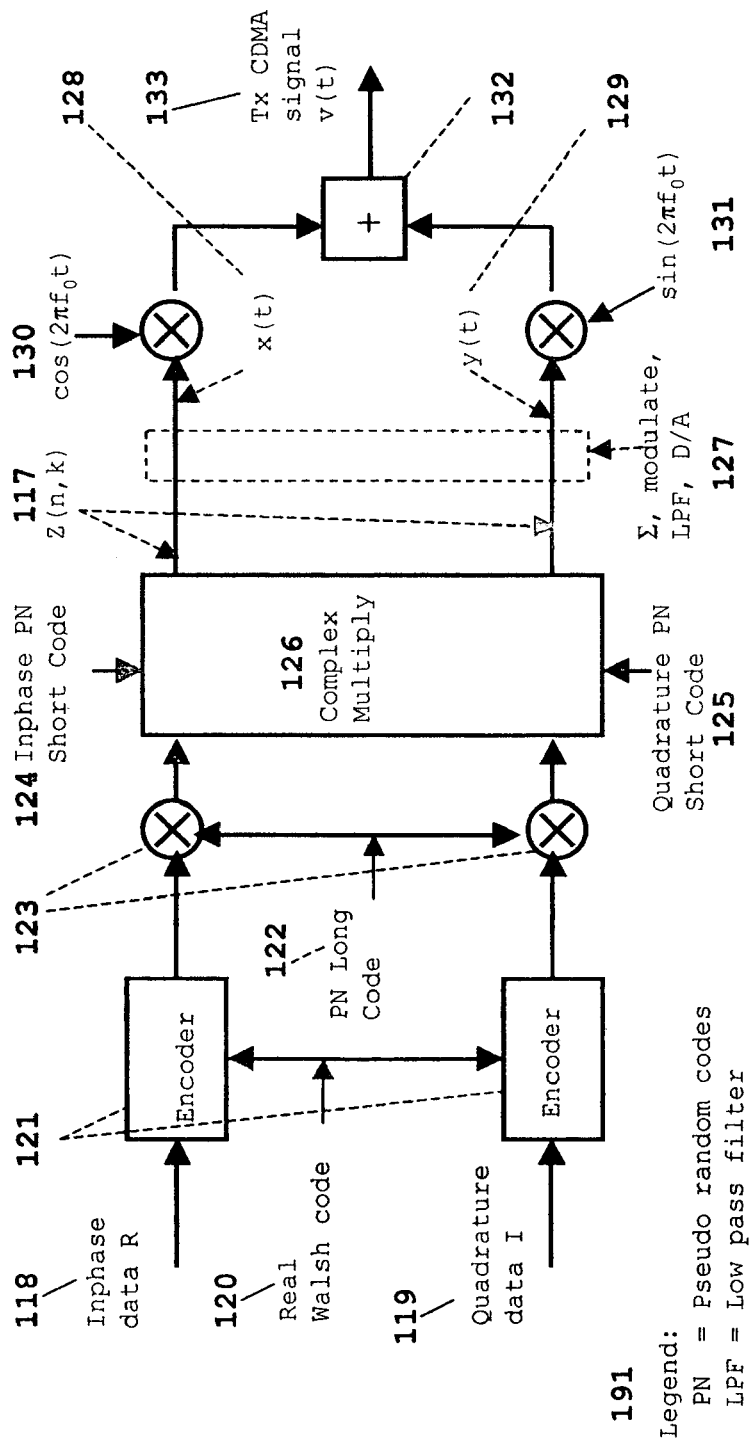

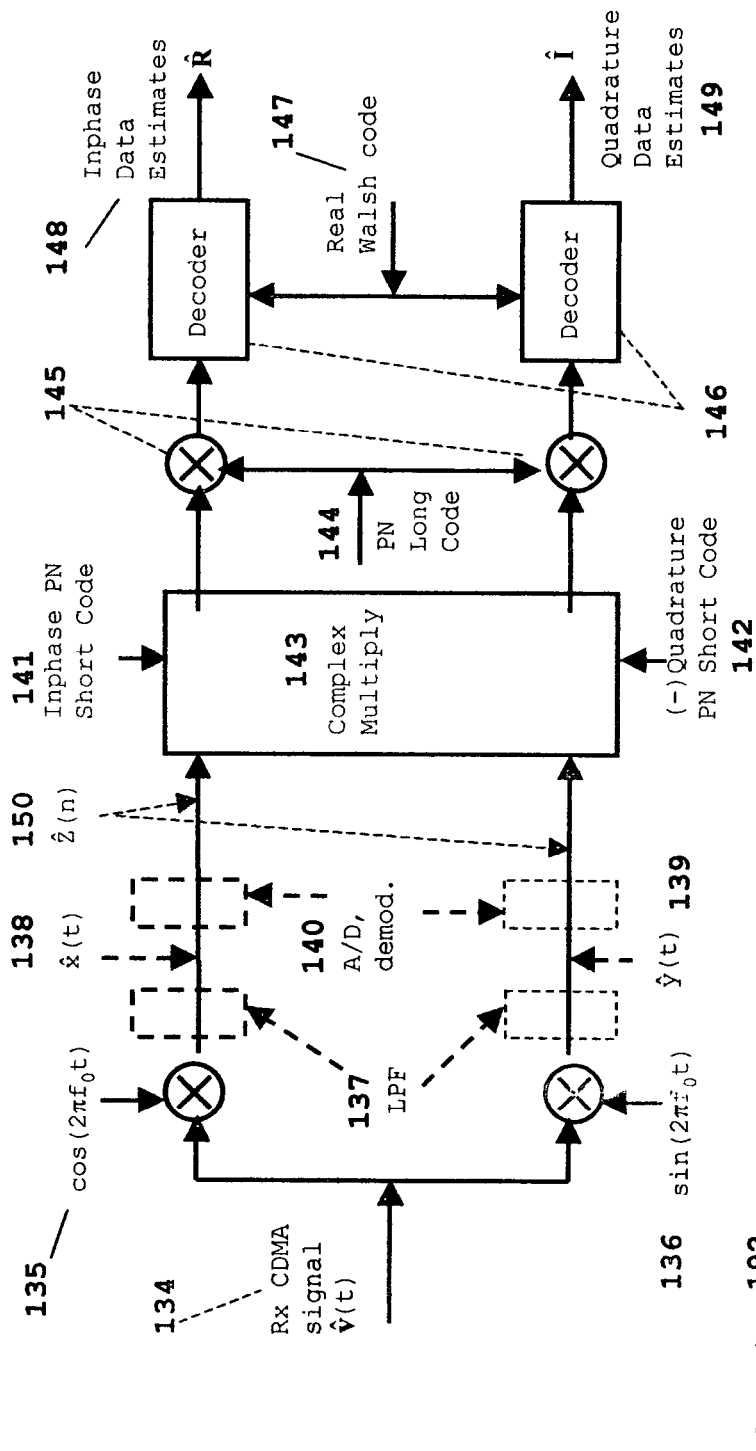
FIG. 3 Prior Art: CDMA Receiver: CDMA Decoding

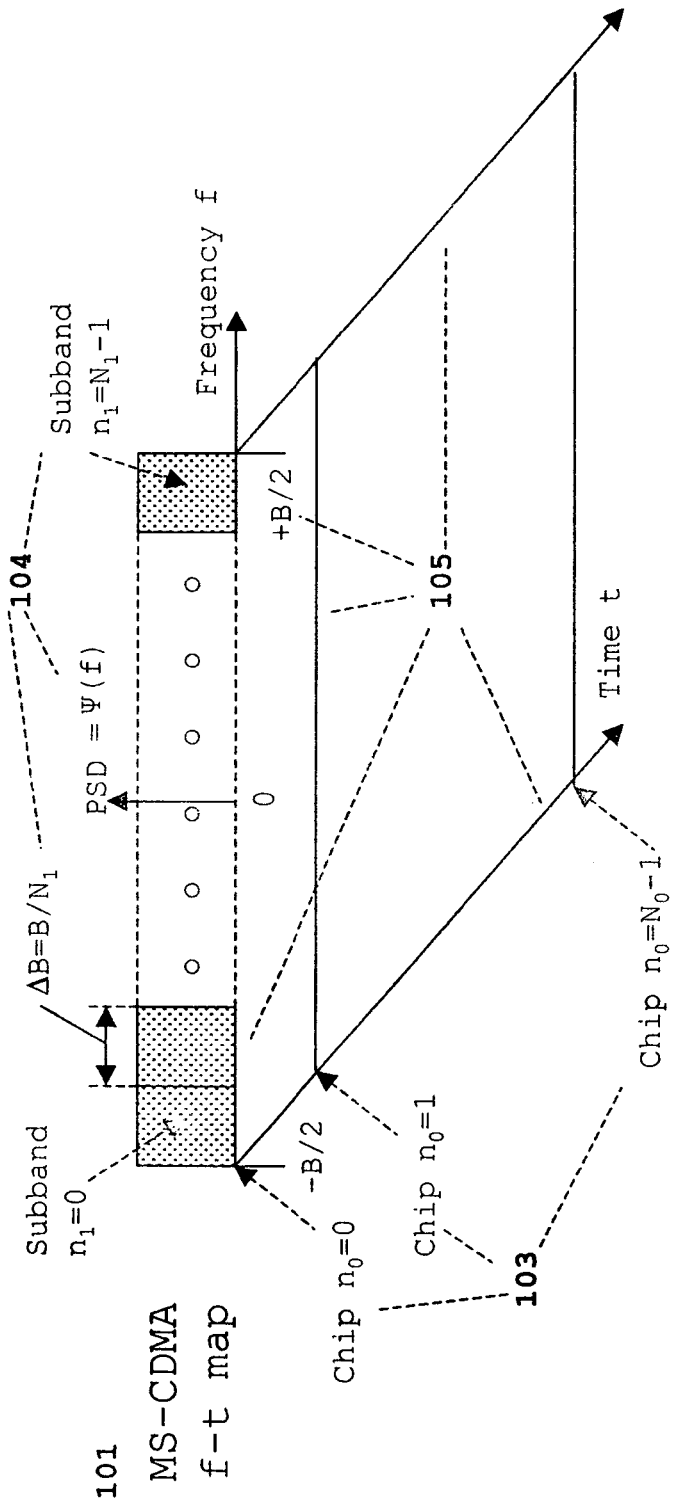
FIG. 4 MS-CDMA Mapping

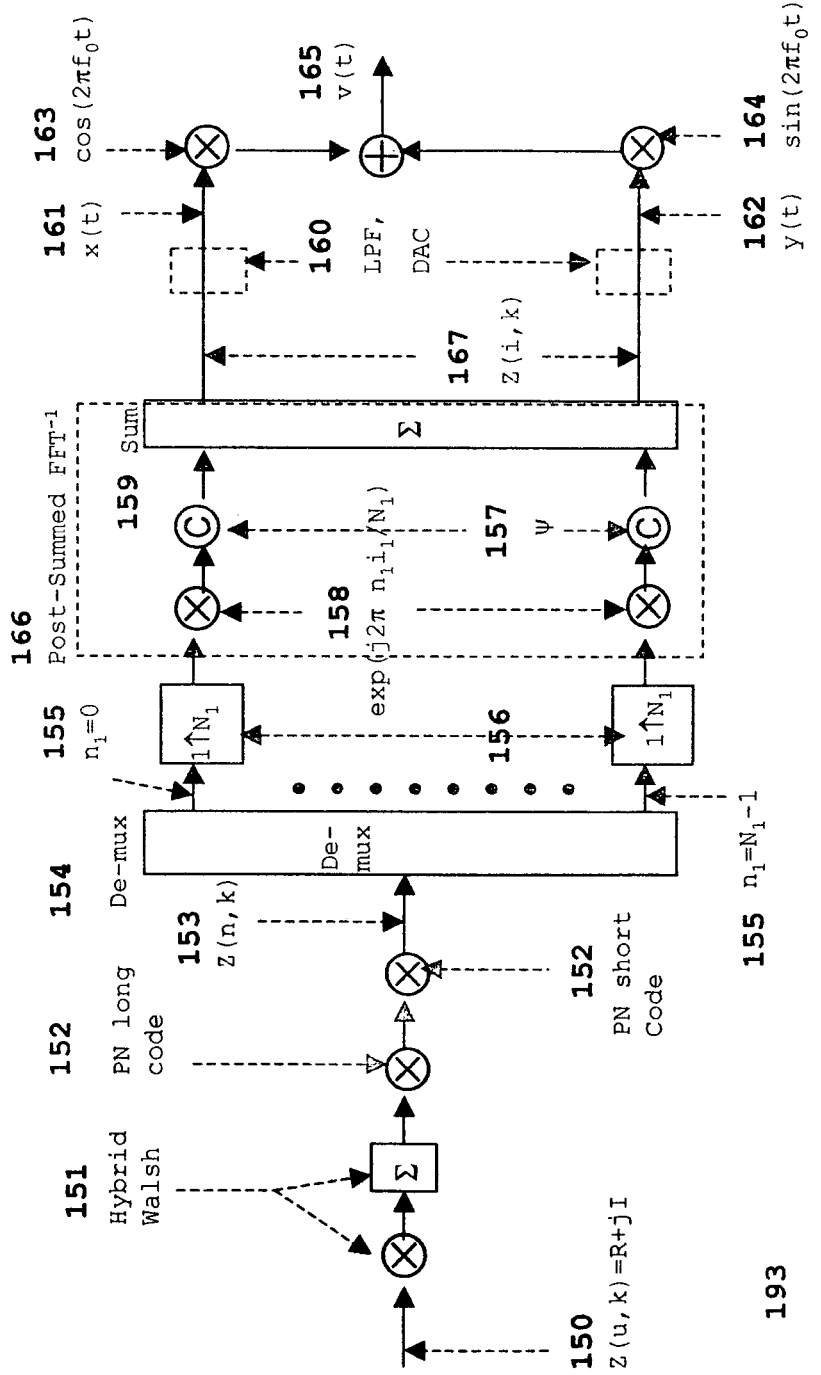
FIG. 5   MS-CDMA Transmitter: MS-CDMA Encoding

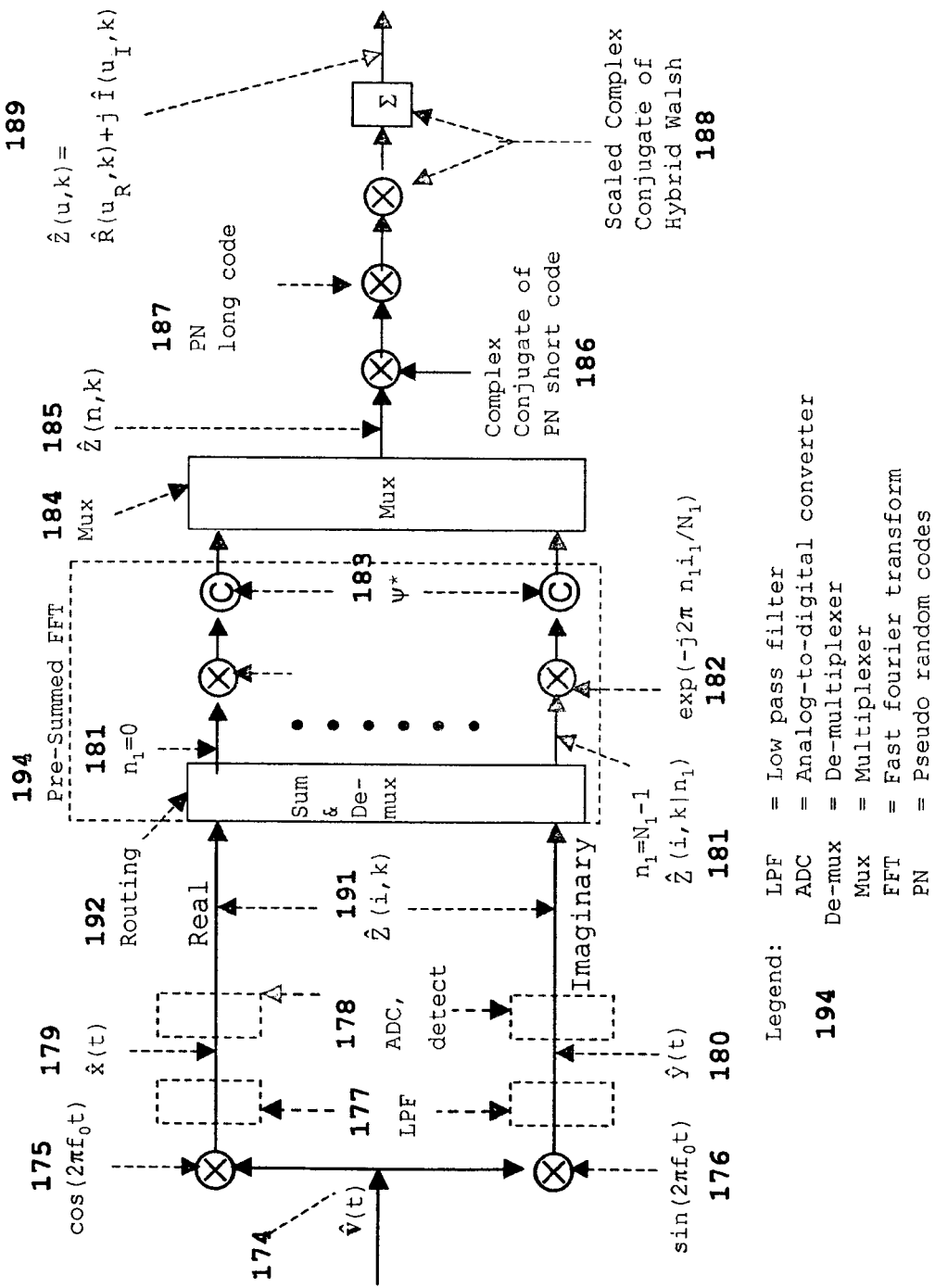
FIG. 6 MS-CDMA Receiver: MS-CDMA Decoding

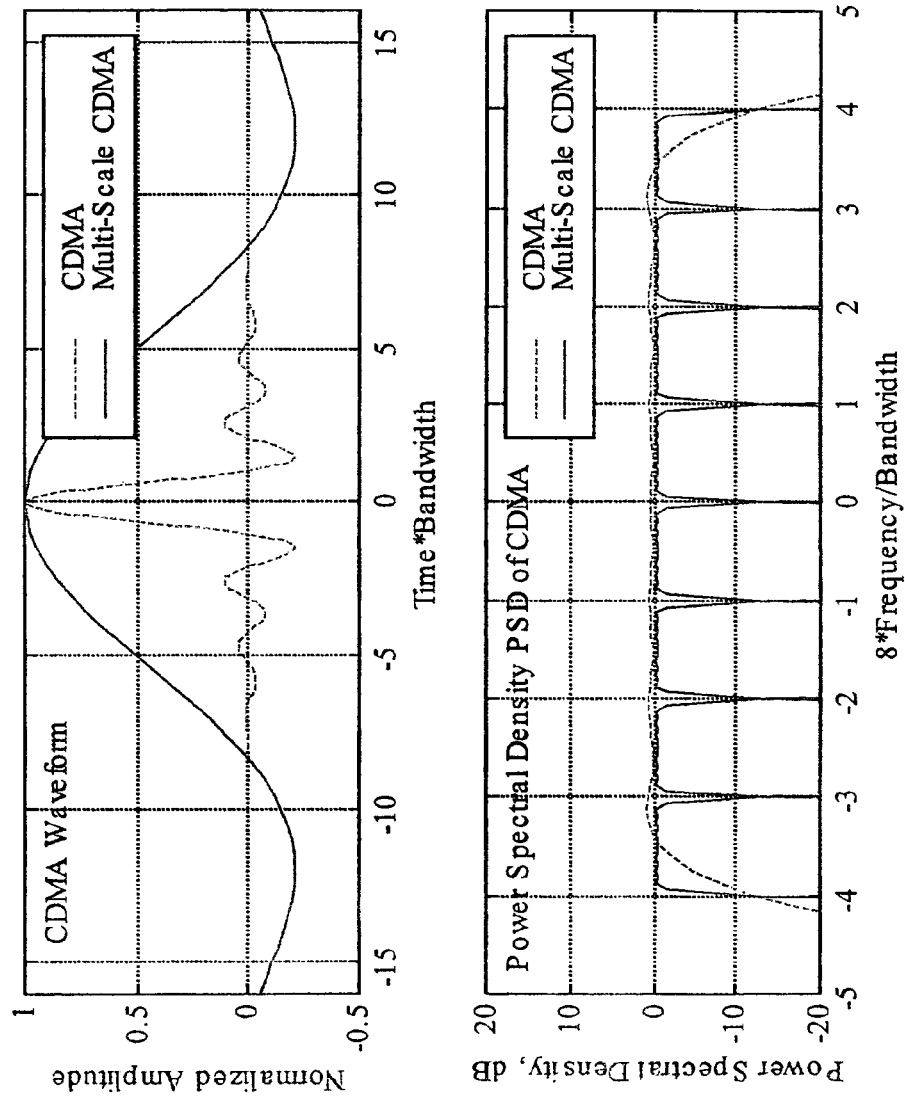
FIG. 7 Waveform and PSD Example for Multi-Scale CDMA with M=8 Subbands

MULTI-SCALE CDMA

BACKGROUND OF THE INVENTION

I. Field of the Invention

The present invention relates to CDMA (Code Division Multiple Access) cellular telephone for wireless wide area cellular networks WAN's, local area networks LAN's, personal area networks PAN's and wireless data communications with data rates up to multiple T1 (1.544 Mbps) and higher (>100 Mbps), and to optical CDMA. Applications are mobile, point-to-point and satellite communication networks. More specifically the present invention relates to a new and novel means for spreading the CDMA orthogonal code over multi-scales to improve bit error rate BER performance, reduce timing requirements, support higher order modulations with correspondingly higher data rates, support power control over the spread bandwidth, and support frequency and time domain equalization.

II. Description of the Related Art

Current CDMA spread spectrum art is represented by the applications to cellular communication links between users and base stations for CDMA2000 and W-CDMA which implement the signal processing in equations (1), (2), (3) and FIGS. 1,2,3 using Walsh orthogonal CDMA channelization codes to generate orthogonal variable spreading factor OVSF codes for multiple data rate users. Walsh codes are Hadamard codes rearranged in increasing sequency order where sequency is the rate of phase rotations over the code length and is the equivalent of frequency in the fourier domain. This scenario considers CDMA communications spread over a common frequency band B for each of the communication channels. These CDMA communications channels for each of the multiple rate users are defined by assigning a unique Walsh orthogonal spreading code to each user. This Walsh code has a maximum length of $N_c$ chips with $N_c=2M$ where M is an integer, with shorter lengths $N_c/2, N_c/4, \ldots, 4, 2$ chips assigned to users with data rates equal to $2, 4, \ldots, N_c/2$ data symbols per $N_c$ block code length. OVSF is equivalent to assigning multiple codes of length $N_c$ to these users so as to support the required data rate for each user. A user with data rate equal to 2 symbols per $N_c$ is assigned 2 of the $N_c$ codes, with a data rate equal to 4 symbols per $N_c$ the user is assigned 4 of the $N_c$ codes, and so forth. This invention disclosure will use this OVSF block code equivalency without any limitations on the disclosure of this invention. Each communications link consists of a transmitter, link, and receiver, as well as interfaces and control. In the transmitter, the user chips are modulated with the assigned orthogonal code and the output signal is spread or covered with one or more pseudo-noise PN sequences or codes over the frequency band B of the communications links. The PN codes for CDMA2000 and W-CDMA are a long PN code which is 2-phase and real followed by a short PN code which is complex and 4-phase. Covering and spreading are considered equivalent for this invention disclosure. Signal output of the covered orthogonal encoded data is modulated or filtered with a waveform $\psi(t)$, up-converted, and transmitted.

Equations (1) give parameters, codes, and power spectral density PSD which is $\Psi(f)$ for the current CDMA encoding and decoding. Scenario parameters 1 are the maximum number of user symbols $N_c$ occupying the CDMA communications links for ideal communications, $T_c$ is the time interval between contiguous CDMA chips or equivalently the chip spacing, user symbol rate $1/T_s = 1/N_c T_c$ is the orthogonal code repetition rate, and the complex user data symbol $Z(u,k)$ for user u and CDMA code block k is the amplitude and phase encoded user symbol input to the CDMA encoding in FIG. 2. Index $u=0, 1, \ldots, N_c-1$ is either the data symbol index or the code index depending on the application. Index $n=0, 1 \ldots, N_c-1$ is either the code chip index or the encoded chip index depending on the application.

Current CDMA Parameters, Codes, and PSD (1)

1 Scenario Parameters $N_c$=Number of user symbols and orthogonal code chips
$T_c$=CDMA chip spacing or repetition interval
$T_s$=User symbol soacing
$1/T_s=1/N_c T_c$=User symbol rate
$Z(u,k)$=User data symbol u for code block k 2 Orthogonal Walsh Code Matrix C $$C = \text{Code matrix, } N_c \text{ rows of } N_c \text{ code vectors}$$
$$= [C(u, n)] \text{ matrix of elements } C(u, n)$$
$$C(u, n) = \{+1, -1\}$$
$$= \exp(j\theta(u, n)) \text{ chip } n \text{ of code vector } u$$

3 PN Covering or Spreading Codes CC for Chip n at User Sample Index k $$C_c(n, k) = \exp(j\theta_c(n, k))$$
$$= PN \text{ chip } n \text{ of code block } k$$

4 PSD $\Psi(f)$ of the CDMA Baseband Signal z(t)

$$\Psi(f) = \int R_z(\Delta t) e^{-2\pi f \Delta t} d(\Delta t) \text{ Fourier transform of } R_z$$
$$= \int R_\psi(\Delta t) e^{-2\pi f \Delta t} d(\Delta t)$$
$$= a_0 |\psi(f)|^2 \text{ PSD of CDMA signal}$$

wherein $$\psi(f) = \text{Fourier transform of } \psi(t)$$
$$R_z(\Delta t) = \int \psi(t)\psi(t + \Delta t) dt \text{ autocorrelation of } z(t)$$
$$= R_\psi(\Delta t) \text{ autocorrelation of } \psi(t)$$
$$a_0 = \text{Scaling factor}$$
$$= \text{Average power level of user symbols}$$
$$= E\{Z(u, k)Z*(u, k)\}/T_s$$

wherein $Z*$ is the complex conjugate of $Z$ and it is assumed the $Z(u, k)$ are statistically independent with zero cross-correlation CDMA orthogonal code 2 can be defined by the orthogonal matrix C whose rows are the code vectors. PN covering or spreading code 3 is the composite of a long PN code followed by a short PN code extending over several orthogonal code repetitions {k} or equivalently data symbol sampling times {k} and is represented by the phase encoded symbol $\exp(j\theta(n,k))$ for chip (n,k), "exp" is the complex exponential, and $j=\sqrt{(-1)}$. PSD $\Psi(f)$ 4 is equal to the PSD $|\psi(f)|^2$ of the waveform to within a scaling factor $a_0$.

Transmitter equations (2) describe the current Walsh CDMA encoding of the input user complex symbols Z(u,k) using the orthogonal Walsh code C for each set k of user symbols and which includes summing the encoded chips over the users and covering the summed user chips with PN codes to generate the current CDMA encoded complex chips Z(n,k) 5. The PN codes uniformly spread the orthogonal encoded chips over the available wideband B and improve the correlation performance for time offsets and for cross-talk with other data blocks. Analog implementation 6 uses a digital-to-analog Current CDMA Encoding for Transmitter (2)
5 CDMA Encoding of the User Symbols $$Z(n, k) = \sum_u Z(u, k)C(u, n)C_C(n, k)$$
$$= \sum_u Z(u, k)\exp[j\theta(u, n) + j\theta_c(n, k)]$$

6 Analog Implementation for Generating the CDMA Complex Baseband Signal z(t)

$$z(t) = \sum_{k,n} Z(n, k) \otimes \psi(t - t(n, k))$$

where
$t(n, k)$ = CDMA data chip $(n, k)$ time indicator
$\otimes$ = Convolution operation
$\psi$ = CDMA pulse waveform converter DAC followed by filtering to generate z(t). This signal processing is represented in 6 as the convolution of the stream of symbols Z(n,k) with the CDMA chip waveform ψ(t) to generate the analog signal z(t) from the current CDMA encoding. In practice a sample-and-hold circuit following the DAC generates a pulse for each symbol and the stream of analog contiguous pulses is convolved with ψ(t) and filtered by a roofing filter to further attenuate the sidelobes of the wideband B spectrum Receiver equations (3) describe the current CDMA decoding which decodes and decovers the received encoded chip estimates $\hat{Z}(n,k)$ of the transmitter chips Z(n,k) in the transmitter, to generate estimates $\hat{Z}(u,k)$ of the user data symbols Z(u,k). Input signal $\hat{Z}(n,k)$ 7 to the current CDMA decoding is the received signal after it has been down-converted, synchronized, analog-to-digital ADC converted, and chip detected to remove the pulse waveform.

Current CDMA Decoding for Receiver (3)
7 Receiver Front End Provides Estimates Z(n,k) of the Encoded Transmitter Chip Symbols Z(n,k)
8 Orthogonality Property of the Walsh Matrix C $$\sum_n C(u, n)C^*(n, \tilde{u}) = \|c\|^{-2}\delta(u, \tilde{u}) \text{ where}$$

$C^*$ = complex conjugate of $C$
$\delta(u, \tilde{u})$ = Delta function of $u$ and $\tilde{u}$
= 1 for $u = \tilde{u}$
= 0 otherwise -continued
$\|c\|$ = Norm or length of row vectors $c$ of $C$ 9 Decovering Property of PN Code $C_c$ $C_c(n,k)C_c^*(n,k)=1$ 10 Decoding Algorithm $$\hat{Z}(u, k) = N_c^{-1}\sum_n \hat{Z}(n, k)C_c*(n, k)C*(n, u)$$

Orthogonality 8 of the Walsh code matrix C and the decovering of $C_c$ 9 are used to construct the algorithm 10 for decoding the received input signals to recover estimates $\hat{Z}(u,k)$ of the user symbols Z(u,k) in the transmitter. Norm is the square root of the length of the row vector c of C and is equal to the square root of the inner product of c with itself and for the current Walsh this norm is equal to $\sqrt{N_c}$.

FIG. 1 is a plot of the CDMA power spectral density PSD $\Psi(f)=a_0|\psi(f)|^2 1$ as a function of the frequency offset f 2. The PSD occupies the frequency band B 3 centered at dc (f=0) and extending over the frequency interval B=(1+α)/T_c 4 where α is the bandwidth expansion parameter of the waveform ψ(t) which accommodates the rolloff of the PSD with frequency. For convenience in this invention disclosure it is assumed that the waveform ψ is an ideal Wavelet waveform disclosed in (Ser. No. 09/826,118) with α=0. Total power P 4 is the integrated value of the PSD over the frequency bandwidth B and is normalized to P=1. For the ideal current CDMA the PSD is flat over this B.

FIG. 2 depicts a representative embodiment of the CDMA transmitter signal processing for the forward and reverse CDMA links between the base station and the users for CDMA2000 and W-CDMA that implements the CDMA Walsh channelization encoding and scrambling of the data for transmission. Data inputs to the transmitter CDMA signal processing are the inphase (real axis) data symbols $R(u_R,k)$ 118 and quadrature (imaginary axis) data symbols $I(u_I,k)$ 119 of the complex data symbols $Z(u,k)=R(u_R,k)+jI(u_I,k)$. A Walsh encoder 121 spreads and channelizes the data by encoding with a real Walsh code 120 the inphase and quadrature data symbols and summing the encoded chips over the data symbols. A long real PN code 122 encodes the inphase and quadrature Walsh encoded chips 123 with a 2-phase binary code followed by a short complex PN code covering in 124,125,126. Outputs are the inphase and quadrature components 117 of the complex chips Z(n,k). The Z(n,k) are low pass filtered (LPF), modulated to waveform encode each chip symbol, and DAC (D/A) convered 127 to generate the analog waveform z(t), and not necessarily in the order listed. The complex baseband analog signal z(t)=x(t)+jy(t) with inphase x(t) 128 and quadrature y(t) 129 components is single sideband (SSB) upconverted 130,131, summed 132, and transmitted 133 as the RF v(t) at the transmission frequency $f_0$.

FIG. 3 depicts a representative embodiment of the receiver signal processing for the forward and reverse CDMA links between the base station and the user for CDMA2000 and W-CDMA that implements the CDMA decoding for the long and short codes, the Walsh codes, and recovers estimates $\hat{R}, \hat{I}$ 148,149 of the transmitted inphase and quadrature data symbols R 118 and I 119 in FIG. 2. Depicted are the principal signal processing that is relevant to this invention disclosure. Signal input $\hat{v}(t)$ 134 in FIG. 3 is the estimate of the received transmitted CDMA signal v(t) 133 in FIG. 2. The inphase mixer multiplies $\hat{V}(t)$ by the cosine 135 of the carrier frequency $f_0$ followed by the LPF 137 which removes the mixing harmonics, and the quadrature mixer multiplies $\hat{v}(t)$ by the sine 136 of the carrier frequency $f_0$ followed by the LPF 137 to remove the mixing harmonics. These inphase and quadrature mixers followed by the LPF perform a Hilbert transform on v(t) to down-convert to baseband the signal at frequency $f_0$ and to recover estimates $\hat{x}$, $\hat{y}$ of the inphase component and the quadrature component of the transmitted complex baseband CDMA signal z(t)=x(t)+jy(t) in 128,129 FIG. 2. The $\hat{x}(t)$ and $\hat{y}(t)$ baseband signals are ADC (A/D) 140 converted and demodulated (demod.) to recover estimates of the Tx CDMA encoded inphase and quadrature baseband chip symbols. The short complex PN code cover is removed by the complex multiply in 143 using the complex conjugate of the short PN code implemented in 141,142 and the long real PN code is removed by the real multiply 145 with the long real PN code 144. The real Walsh code 147 is removed by the decoder 148. Decoded output symbols are the estimates $\hat{R}$, $\hat{I}$ 148,149 of the inphase data symbols R and the quadrature data symbols I from the transmitters in 118,119 FIG. 2.

It should be obvious to anyone skilled in the communications art that this example implementation clearly defines the fundamental current CDMA signal processing relevant to this invention disclosure and it is obvious that this example is representative of the other possible signal processing approaches.

SUMMARY OF THE INVENTION

This invention discloses the architecture and algorithms for spreading CDMA codes uniformly within the subbands of a filter bank over a full band and over the subbands and with controllable subband power levels. This architecture is a 2-scale example of multi-scale CDMA (MS-CDMA) and assigns an algebraic field of indices "0" to spreading within each subband and an algebraic field of indices "1" to spreading over the subbands. These algebraic fields are scaled by the respective factors "1" and "$N_0$" and combined to form the algebraic field of indices for the 2-scale CDMA codes and wherein "$N_0$" is the number of chips within each of the subbands. This scaled algebraic field architecture ensures uniform spreading within and over the subbands when the input data symbols are encoded by the 2-scale CDMA code and mapped onto the subbands and over the subbands using the scaled algebraic field assignments. An alternate algorithm in this invention disclosure is to use a tensor product construction to generate this multi-scale mapping as a multi-linear function of the scaled index fields. The 2-scale MS-CDMA in this invention disclosure performs a Wavelet dilation type of operation to stretch the CDMA chips while maintaining the spreading over the full frequency band An example implementation for 8 subbands is calculated and compared with current CDMA spreading over the fullband. From the viewpoint of MS-CDMA the current CDMA is a 1-scale CDMA.

BRIEF DESCRIPTION OF THE DRAWINGS AND THE PERFORMANCE DATA

The above-mentioned and other features, objects, design algorithms, and performance advantages of the present invention will become more apparent from the detailed description set forth below when taken in conjunction with the drawings wherein like reference characters and numerals denote like elements, and in which:

FIG. 1 is a representative CDMA flat power spectral density (PSD) for current CDMA FIG. 2 is a representative CDMA transmitter signal processing block diagram.

FIG. 3 is a representative CDMA receiver signal processing block diagram.

FIG. 4 depicts a representative MS-CDMA 2-scale mapping.

FIG. 5 is a representative MS-CDMA transmitter signal processing block diagram.

FIG. 6 is a representative MS-CDMA receiver signal processing block diagram.

FIG. 7 is an example of the waveform and the power spectral density PSD for MS-CDMA with $N_1$=8 subbands.

DISCLOSURE OF THE INVENTION

Signal processing elements for the 2-scale CDMA example of multi-scale CDMA (MS-CDMA) in this invention disclosure are defined in equations (4). In 40 the chip index n for the non-factorable $N_c \times N_c$ CDMA code matrix C is partitioned into 2 algebraic index fields $n_0, n_1$ corresponding to the scale "0" with index $n_0$ for the chips within each subband and the scale "1" with index $n_1$ for the chips over the subbands and where $n=n_0+n_1N_0=0, 1, \ldots, N_c-1$, $n_0=0, 1, \ldots, N_0-1$, $n_1=0, 1, \ldots, N_1-1$, and $N_c=N_0N_1$. This partitions the user symbol index field u into the corresponding set of index fields $u_0, u_1$. Non-factorable means the elements of C cannot be factored into a product of the elements of a code matrix over the index field $n_0$ with the elements of a code matrix over the index field $n_1$.

In 41 in equations (4) the factorable code matrix C is constructed by a tensor or Kronecker product $C=C_1 \otimes C_0$ of the $N_1 \times N_1$ code matrix $C_1$ with the $N_0 \times N_0$ matrix $C_0$. The tensor product property enables the code elements of C to be factored $C(u,n)=C_1(u_1,n_1)C_0(u_0,n_0)$ into the product of the CDMA code element $C_0(u_0,n_0)$ for field $n_0$ with the code element $C_1(u_1,n_1)$ for field $n_1$ which simplifies the encoding and decoding of the 2-scale CDMA. Tensor product factorization is a property of the Walsh. A subset of the Hybrid Walsh and generalized Hybrid Walsh complex orthogonal CDMA matrices disclosed in patent applications (Ser. No. 10/826,117) and (Ser. No. 10/846,410) are factorable as tensor products.

MS-CDMA Parameters and Codes (4)

40 Non-Factorable C: CDMA Code Matrix C $$C = [C(u, n)]$$
$$= [C(u_0 + u_1N_0, n_0 + n_1N_0)]$$

41 Factorable C: Tensor Product Construction of C $$C = C_1 \otimes C_0$$
$$= [C_1(u_1, n_1)C_0(u_0, n_0)]$$

wherein "$\otimes$" denotes the tensor product

42 PN Covering or Spreading Code $C_c$ $$C_c(n_0,n_1,k)=\exp(j\theta_c(n_0,n_1,k))$$

43 Variable Power Control

PSD $\Psi(f)$ PSD for the current art 4 in equations (1) is modified by the introduction of the subband weights $w(n_1)$ $$P = \Psi(f)B \text{ with no subband weighting}$$

$$= \sum_{n_1} w(n_1)\Psi(f|n_1)\Delta B \text{ with weighting}$$

$$= 1$$

where
P=Total power in bandwidth B
B=Frequency bandwidth of Tx signal
$\Delta B = B/N_1$=Subband spacing $$\Psi(f|n_1) = a_0|\psi(f|n_1)|^2$$

$$\psi(f|n_1) = \text{Fourier transform of } \psi(t|n_1)$$

$$= \text{Subband } n_1 \text{ filter response}$$

$\psi(t|n_1)$=Subband $n_1$ time waveform
$w(n_1)$=Subband weighting for power allocation $$\sum_{n_1} w(n_1) = 1 = \text{Normalization of weights}$$

44A Tx changes to support subband power control
Non-factorable: C(u,n) is replaced by $$C(u, n_0+n_1N_0)(w(n_1))^{1/2}$$

Factorable: Factor $C_1(u_1,n_1)$ is replaced by $$C_1(u_1,n_1)w(n_1)^{1/2}$$

44B Rx Changes to Support Subband Power Control
Non-factorable: C*(n,u) is replaced by $$C^*(n_0+n_1N_0,u)w(n_1)^{(-1/2)}$$

Factorable: Factor $C_1^*(n_1,u_1)$ is replaced by $$C^*(n_1,u_1)w(n_1)^{(-1/2)}$$

In 42 the PN covering code $C_c$ is the PN code for the current CDMA modified in indexing to also identify the PN code chips for each subband using the index fields $n_0$ and $n_1$.

In 43 the variable power control over the wideband B spanned by the $N_1$ subbands of scale "1" and the PSD are implemented by weighting the orthogonal encoding matrix C with the power control weight values $w(n_1)^{1/2}$ for the $N_1$ subbands. In 44A the Tx weighting for non-factorable C multiplies the elements C(u,n) by the weights $w(n_1)^{1/2}$ and for a factorable C these weights multiply the elements $C_1(u_1,n_1)$ of the factor $C_1$. For the Rx in 44B the corresponding weights $w(n_1)^{(-1/2)}$ multiply the elements of the complex conjugate transpose of C and of $C_1$ for the non-factorable and factorable C respectively. In 43 the PSD is normalized with P=1 which is identical to the normalization for the current CDMA PSD in 4 in FIG. 1. With no power control the subband unweighted PSD's $\Psi(f|n_1)$ have the same scaling $\Psi(f|n_1)=1/B$ for all frequencies f within the $n_1$ subband and zero outside the subband as the PSD for the current CDMA in FIG. 1 within the band B. In these equations the notation f(x|y) is a function of x given y and the PSD equations apply for frequencies within their bandwidths. With weighting $w(n_1)$ for subband power control, the PSD frequency values depend on the subband weighting with the total power remaining unity P=1. The fourier transform of the chip waveform $\psi(t|n_1)$ for subband $n_1$ is equal to $\psi(f|n_1)$ and the subband PSD $\Psi(f|n_1)$ is equal to the squared absolute value of the pulse waveform frequency response $\psi(f|n_1)$ to within a multiplicative scaling factor $a_0$ defined in 4 in equations (1).

Tx implementation equations (5) describe the MS-CDMA encoding of the user symbols Z(u,k).
Tx 2-Scale CDMA Encoding (5)
45 Tx MS-CDMA Encoding
Step 1 CDMA chip encoding $$Z(n_0,n_1,k)=E_u Z(u,k)(w(n_1))^{1/2}C(u,n)C_c(n,k)$$

wherein $\Sigma_u$ is the summation over u
Step 2 waveform modulation $$Z(i_1,n_0,n_1,k)=\Sigma_{\Delta n_0}\Sigma_{\Delta k}Z(n_0+\Delta n_0,n_1,k+\Delta k)\times\psi(i-(n_0+\Delta n_0)N_1-(k+\Delta k)N_c)$$

where
$i=i_1+n_0N_1+kN_c$ sample index $$i_1 = 0, 1, 2, \ldots, N_1-1$$

$$= \text{index over chip interval}$$

$\psi(i_\psi)$=chip waveform
$i_\psi=i_1+\Delta i_1 N_1$ chip waveform index $$\Delta i_1 = 0, +/-1, \ldots \text{ over } -L/2 \text{ to } L/2-1$$

$$= \text{chip index over the } \psi \text{ length } N_1 L$$

"x"=multiply algebraic operation
Step 3 subband signal translated to $n_1$ frequency offset $$Z_1(i_1,n_0,n_1,k)=Z(i_1,n_0,n_1,k)\exp(j2\pi n_1 i_1/N_1)$$

Step 4 encoded Tx signal $$Z(i_1,n_0,k)=\Sigma_{n_1}Z_1(i_1,n_0,n_1,k)$$

Step 5 MS-CDMA encoded analog Tx signal z(t)

$$Z(i)=Z(i_1,n_0,k)$$

$$z(t)=DAC\{Z(i)\}$$

46 Tx Computationally Efficient Post-Summed $FFT^{-1}$ Algorithm
Step 1 fast CDMA encoding algorithm implements:

$$Z(n_0,n_1,k)=\Sigma_u Z(u,k)w(n_1)^{1/2}C(u,n)C_c(n,k)$$

Step 2 $FFT^{-1}$ generates intermediate function $\chi(i_1, n_0, k)$ $$\chi(i_1, n_0, k) = \sum_{n_1} Z(n_0, n_1, k) e^{j2\pi n_1 i_1/N_1}$$

Step 3 post-sum $\chi(i_1, n_0, k)$ $$Z(i) = \sum_{\Delta n_0, \Delta k} \chi(i_1, n_0+\Delta n_0, k+\Delta k)\psi(i-(n_0+\Delta n_0)N_1-(k+\Delta k)N_c)$$

Step 4 MS-CDMA encoded analog Tx signal z(t)

$$z(t)=DAC\{Z(i)\}$$

47 Complexity Metric $R_M$ $R_M$ = Number of real multiplies per wideband chip $\cong 2\log_2(N_1)$  for $DFT +$ $2L$  for filtering $= 8 + 16 = 24$ for $N_1 = 16, L = 8$ Step 1 in 45 of the MS-CDMA Tx encoding performs the weighted CDMA encoding and covering of the encoded chips with PN codes.

Step 2 modulates the $N_1$ parallel streams of digital samples $Z(n_0, n_1, k)$ from step 1 with the chip waveform $\psi$ to generate the complex baseband signal $Z(i_1, n_0, n_1, k)$ over the chip interval indexed by $i_1$ with parameters $n_0, n_1, k$. Steps 3, 4 together take the inverse fast fourier transform $FFT^{-1}$ of this modulated signal with respect to the subband frequency index $n_1$ to generate the $N_1$ subbands and sum these subbands to generate the encoded MS-CDMA signal $Z(i_1, n_0, k)$.

Step 3 in this $FFT^{-1}$ channelizes the subbands to generate the subband $n_1$ digital signal $Z_1(i_1, n_0, n_1, k)$. In step 2 the subband waveform $\psi(i_\psi)$ is defined as a function of the chip waveform index $i_\psi$, which extends over the length of $\psi$ equal to $LN_1$ samples. Sample index $i$ is composed of the index $i_1$ over the digital samples for one chip interval $N_1$, subband chip index $n_0$, and the block code index $k$. Differential indices $\Delta n_0, \Delta k$ are used to include the overlap of modulated chips. Digital sampling of the frequency band B is at the Nyquist rate which means it is assumed that $N_1$ is large enough to provide adequate resolution at the Nyquist rate without oversampling. When oversampling is required the derivation becomes more involved but the results are the same.

Step 4 in the $FFT^{-1}$ sums the subband signals $Z_1(i_1, n_0, n_1, k)$ from step 3 to generate the MS-CDMA encoded signal $Z(i_1, n_0, k)$. Step 5 converts this signal to the analog signal z(t) over the CDMA block length by replacing the index $i_1$ and parameters $n_0, k$ in $Z(i_1, n_0, k)$ with the index i and by DAC converting $Z(i)$ to z(t) and wherein the DAC conversion is expressed functionally as DAC{$Z(i)$}.

In the Tx MS-CDMA encoding in equations (5), in the Rx decoding in equations (6), and in FIGS. 5,6 the MS-CDMA spectrum is shifted to the frequency interval from 0 to B for convenience and without any restriction on this patent disclosure. The pulse modulation waveform for subband $n_1$ is equal to $\psi(i|n_1)=\psi(i)\exp(j2\pi n_1 i/N_1)$. This means that steps 2, 3, 4 could be combined into the single step $Z(i_1, n_0, k)=\Sigma_{n_1} Z(n_0, n_1, k) \otimes \psi(i|n_1)$. Another property is that the fourier transform or equivalently the frequency response of the modulation waveform for subband $n_1$ is equal to $\psi(f|n_1)=\psi(f-n_1\Delta B)$ when the PSD extends over the frequency range f=0 to f=B and wherein $\Delta B=B/N_1$ is the bandwidth of each subband.

In equations (5) the Tx baseband signal equations in 45 are are replaced by a computationally efficient post-summed $FFT^{-1}$ implementation algorithm 46 starting with step 1 which performs a computationally efficient or fast CDMA encoding to generate the chip sequence $Z(n_0, n_1, k)$. Step 2 takes the $FFT^{-1}$ of this chip sequence to generate the intermediate function $\chi(i_1, n_0, k)$. Step 3 performs a post-sum filtering consisting of modulating this intermediate function with the waveform $\chi$ to generate the MS-CDMA encoded signal $Z(i)$ in 45. Step 4 converts this signal into the MS-CDMA encoded analog Tx signal z(t) in step 5 in 45. A useful metric 47 measuring the computational complexity and also the implementation complexity is the number of real multiplies per chip $R_M$. The example calculation 47 for the subband waveform length L=8 in units of the subband chip length and $N_1=16$ subbands, yields $R_M=24$.

Rx implementation equations (6) define the computationally efficient algorithms that describe the MS-CDMA decoding which processes the received estimates $\hat{Z}(i)$ of the transmitted digital samples $Z(i)$ 45, 46 in equations (5) to recover estimates $\hat{Z}(u,k)$ of the transmitter user symbols $Z(u,k)$ 45 in equations (5). Rx input signal estimate $\hat{z}(t)$ of the Tx baseband signal z(t) for MS-CDMA decoding is the Rx signal after it has been downconverted to baseband, synchronized, and filtered.

xxx

Rx 2-Scale CDMA Decoding (6)

51 MS-CDMA Chip Decoding

Step 1 estimate of MS-CDMA Tx signal $\hat{Z}(i)=ADC\{\hat{z}(t)\}$

Step 2 subband signals translated in frequency to baseband $\hat{Z}(i_1,n_0,n_1,k)=\hat{Z}(i)\exp(-j2\pi n_1 i_1/N_1)$ Step 3 demodulation and detection of baseband signals $\hat{Z}(n_0,n_1,k)=\hat{Z}(i_1,n_0,n_1, k) \hat{\ }\psi^*(i)$ Step 4 CDMA decoding $\hat{Z}(u,k)=\|c\|^2\Sigma_n \hat{Z}(n_0,n_1,k)(w(n_1)\hat{\ }(-½)C_c^*(n,k)C^*(n,u)$ 52 Rx Computationally Efficient Pre-Summed FFT Algorithm Step 1 estimate of MS-CDMA Tx signal $\hat{Z}(i)=ADC\{\hat{z}(t)\}$ Step 2 pre-sum $\gamma(i_1, n_0, n_1, k)$ $\gamma(i_1, n_0, n_1, k)i) = \sum_{\Delta k} \sum_{\Delta n_0} \hat{Z}(i)\psi * (i - (n_0 + \Delta n_0)N_1 - (k + \Delta k)N_c)$ Step 3 performs the FFT of the pre-sum $\hat{Z}(n_0,n_1,k)=(1/N_1)\Sigma_{i_1}\gamma(i_1,n_0,n_1,k)\exp(-j2\pi n_1 i_1/N_1)$ Step 4 fast CDMA decoding algorithm implements:

$\hat{Z}(u,k)=\mu c\|^2\Sigma_n \hat{Z}(n_0,n_1,k)(w(n_1)\hat{\ }(-½)C_c^*(n,k)C^*(n,u)$ 53 Complexity Metric $R_M$ $R_M$ = Number of real multiplies per wideband chip $\cong 2\log_2(M)$  for $DFT +$ $2L$  for filtering $= 8 + 16 = 24$ for $M = 16, L = 8$ 55 CDMA Orthogonality $\sum_n \sqrt{w(n_1)} \, C(u, n))w(n_1)^{-1/2}C^*(n, \tilde{u}) = \|c\|^2\delta(u, \tilde{u})$ Steps 1-4 in 51 in equations (6) define the Rx decoding algorithms for MS-CDMA starting with step 1 which recovers the encoded data symbol estimate $\hat{Z}(i)$ of the Tx encoded data symbol $Z(i)$ from the Rx baseband signal estimate $\hat{z}(t)$ of the Tx z(t) with an ADC. The ADC conversion is expressed functionally as ADC{ẑ(t)}. Step 2 translates each $n_1$ subband to baseband and step 3 removes the chip modulation waveform ψ to complete the demodulation and chip detection to recover the estimate $\hat{Z}(n_0, n_1, k)$ of the Tx CDMA encoded chips $Z(n_0, n_1, k)$. The chip demodulation waveform ψ* isolates the subband channels in this processing to ensure the recovery of $\hat{Z}(n_0, n_1, k)$. Step 4 performs the CDMA decoding to recover the symbol estimates $\hat{Z}(u,k)$.

The fast MS-CDMA Rx pre-summed FFT decoding algorithm is defined in 52 in steps 1-4 starting with step 1 which recovers the encoded data symbol estimate $\hat{Z}(i)$ of the Tx encoded data symbol $Z(i)$ from the Rx baseband signal estimate ẑ(t) of the Tx z(t) with an ADC. Step 2 is the part of the fast algorithm which performs a pre-sum filtering operation, and step 3 of the fast algorithm performs an FFT on the pre-sum filtered samples. In step 4 a fast CDMA decoding is performed to recover the symbol estimates $\hat{Z}(u,k)$. This fast algorithm has been defined in patent applications (Ser. No. 10/826,117) and (Ser. No. 10/846,410). In 53 the complexity metric is computed and is observed to be the same as computed for the transmit signal recovery algorithm 47 in equations (5). In 55 the orthogonality equation is given for the MS-CDMA and is observed to be a generalization of the CDMA orthogonality in 8 in equations (3) with the generalization including the subband weights $w(n_1)$ and the use of Hybrid Walsh and generalized Hybrid Walsh codes from patent applications (Ser. No. 10/826,117) and (Ser. No. 10/846,410) in addition to the Walsh codes for the orthogonal channelization codes.

FIG. 4 depicts the frequency-time (f-t) mapping 101,105 of the MS-CDMA for the example 2-scale application in FIGS. 5,6. The MS-CDMA code 102 is used to define the frequency-time f-t map 101. Indices $n_0=0, 1, 2, \ldots, (N_0-1)$ are mapped onto the chips 103 in the time domain of each of the $N_1$ subbands and indices $n_1=0, 1, 2, \ldots (N_1-1)$ are mapped onto the subbands 104 of the frequency domain. In 104 the PSD ψ(f) and subband spacing $\Delta B=B/N_1$ are defined in 43 in equations (4).

FIG. 5 depicts a representative signal processing diagram which implements the MS-CDMA encoding algorithms in equations (5). The CDMA transmitter block diagram in FIG. 2 becomes a MS-CDMA transmitter when the CDMA encoding depicted in FIG. 2 is replaced by MS-CDMA encoding depicted in FIG. 5. Signal processing starts with the input stream of encoded data symbols $Z(u,k)$ from the transmitter symbol encoder. The CDMA encoding of the data symbols $Z(u,k)$ in 151 can use hybrid Walsh orthogonal channelization codes or generalized hybrid Walsh (Ser. No. 09/826,117) and (Ser. No. 09/846,410) code upgrades to the current Walsh codes. These CDMA codes are weighted by the subband weights $w(n_1)^{1/2}$. CDMA encoded data symbols are covered by a long PN code 152 and by a short PN code 152 to generate the encoded data symbols $Z(n,k)=Z(n_0, n_1, k)$ 153. These encoded symbols are routed by a de-multiplex (de-mux) 154 to the $N_1$ subbands $n_1=0, 1, 2, \ldots, N_1-1$ 155 where they are up-sampled 156 to the Nyquist sample rate for the fullband B. Subband outputs are multiplied by the respective subband frequencies $\exp(j2\pi n_1 i_1/N_1)$ 158 and convolutionally encoded 157 with the chip waveform ψ wherein the symbol "ⓒ" indicates convolution. Outputs are summed Σ159 to yield the MS-CDMA baseband signal $Z(i)$ 167 with an efficient post-summed inverse fast fourier transform $FFT^{-1}$ algorithm 166 which performs the waveform modulation 157, frequency translation 158, and the summing 159 of the outputs to yield $Z(i)$ 167. Inphase outputs are lowpass filtered LPF and DAC converted 160 to generate x(t) 161 and the quadrature outputs are also lowpass filtered LPF and DAC converted 160 to generate y(t) 162 which are the real and complex components respectively of the Tx baseband signal z(t)=x(t)+jy(t). An SSB up-conversion is executed by multiplying x(t) in 163 by the cosine and y(t) in 164 by the sine of the transmission frequency $f_0$ and summing to yield the transmitted signal v(t) 165 which is the transmitted signal 133 in FIG. 2.

FIG. 6 depicts a representative MS-CDMA receiver signal processing diagram which implements the MS-CDMA decoding algorithms in equations (6). The CDMA receiver block diagram in FIG. 3 becomes a MS-CDMA receiver when the CDMA decoding depicted in FIG. 3 is replaced by MS-CDMA decoding depicted in FIG. 6. FIG. 6 signal processing starts with the Rx signal v̂(t) 174 which is the Rx estimate of the Tx signal v(t) 165 in FIG. 5. SSB down-conversion to baseband is implemented by multiplying this Rx signal by the cosine 175 of the carrier frequency $f_0$ followed by low pass filtering LPF 177 and multiplying by the sine 176 of the carrier frequency $f_0$ followed by LPF to respectively generate the real component x̂(t) 179 and the imaginary component ŷ(t) 180 of the estimate ẑ(t)=x̂(t)+jŷ(t) of the Tx baseband signal z(t) 161,162 in FIG. 5. This signal is ADC converted and detected in 178 to generate the Rx estimate $\hat{Z}(i,k)$ 191 of the Tx baseband MS-CDMA signal $Z(i,k)$ 167 in FIG. 5. Real and imaginary components of $\hat{Z}(i)$ are summed to yield $\hat{Z}(i,k)$ and routed 192 to the $N_1$ subbands 181 with $\hat{Z}(ii,k|n_1)$ directed to subband $n_1$ for $n_1=0, 1, 2, \ldots, N_1-1$ where the symbol "|" is used to separate the conditional parameters from the executable variables. Each subband signal $\hat{Z}(i,k|n_1)$ is frequency translated to baseband by multiplication with $\exp(-j2\pi n_1 i_1/N_1)$ 182, subband filtered by convolution with the complex conjugate of the chip waveform ψ* 183, and multiplexed (mux) combined 184 which signal processing is implemented by the pre-summed fast FFT algorithm in 52 in equations (6) to generate the Rx estimate $\hat{Z}(n,k)$ 185 of the MS-CDMA encoded signal $Z(n,k)$ 153 in FIG. 5. The short PN code is removed 186 by multiplying with the complex conjugate of the code and the long PN code 187 is removed by multiplying with the real code. The CDMA code is removed by multiplying with the complex conjugate transpose of the CDMA code with preweighting $w(n_1)^{\wedge}(-1/2)$ and with the orthogonality scale factor $\|c\|^2$ and summing to perform the CDMA decoding in step 4 of 51, 52 in equations (6) and to yield the Rx estimate $\hat{Z}(u,k)$ of the Tx user symbols $Z(u,k)$ 150 in FIG. 5 with identification of the real axis (inphase axis) user symbol estimates $\hat{R}(u_R,k)$ and the imaginary axis (quadrature axis) user symbol estimates $\hat{I}(u_I,k)$ 189 for applications involving separate user symbols on the real and imaginary axes of the Tx user symbols $Z(u,k)$ =R+jI 150 in FIG. 5. The CDMA code in 188 includes the use of the Walsh as well as the hybrid Walsh and generalized hybrid Walsh codes from patent applications (Ser. No. 10/826,117) and (Ser. No. 10/846,410).

FIG. 7 MS-CDMA example illustrates the impact on the waveform and PSD of MS-CDMA for $N_1=8$ subbands using ψ from (Ser. No. 09/826,118). This example demonstrates the dilation (lengthening) of the waveform by the factor $N_1=8$ while keeping the PSD across the full bandwidth essentially unchanged except for some rolloff and ripple. The PSD's for the MS-CDMA subbands are individually calculated to illustrate the composition of the PSD.

Preferred embodiments in the previous description are provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the wider scope consistent with the principles and novel features disclosed herein.

What is claimed is:

1. A method for reducing a CDMA chip rate, said method comprising the steps of:

partitioning a CDMA frequency band into a set of equal size frequency subbands;

generating two orthogonal CDMA codes with a first CDMA code having first CDMA code indices for encoding data symbols within each subband, and a second CDMA code having second CDMA code indices for encoding data symbols over the entire set of subbands, wherein the first CDMA code provides a first scale of CDMA encoding and the second CDMA code provides a second scale of CDMA encoding;

generating a 2-scale CDMA code using a tensor product of the second CDMA code with the first CDMA code to generate the 2-scale CDMA code;

wherein the steps of generating further include encoding data symbols with said 2-scale CDMA code to generate encoded chips;

assigning each of the encoded chips to a subband in accordance with the second CDMA code indices, and assigning each encoded chip to a chip position within its assigned subband in accordance with the first CDMA code indices; and encoding said encoded chips with pseudonoise (PN) encoding.

2. A method for reducing a CDMA chip rate, said method comprising the steps of:

partitioning a CDMA frequency band into a set of equal size frequency subbands;

generating a CDMA code with a code length equal to a product of a number of chips for a first scale CDMA encoding having first code and chip indices used to encode data symbols within each subband and a number of chips for a second scale CDMA encoding having second code and chip indices used to encode data symbols over the entire set of subbands;

forming a 2-scale CDMA code by assigning code and chip indices such that the 2-scale CDMA code and chip indices are the algebraic addition of the first code and chip indices plus scaled second code and chip indices wherein said scaled second code and chip indices are generated using a scale factor that comprises the number of indices in the first scale CDMA code;

wherein the steps of generating and forming further include encoding data symbols with the 2-scale CDMA code to generate encoded chips;

assigning each of the encoded chips to a subband in accordance with the second CDMA code indices, and assigning each encoded chip to a chip position within its assigned subband in accordance with the first CDMA code indices; and encoding said chips with pseudonoise (PN) encoding.

3. The method of claims 1 or 2 further including an encoding implementation, comprising the steps of:

waveform modulating the encoded chips in each subband to generate subband signals;

frequency translating each signal to occupy its respective frequency subband; and combining these frequency translated subband signals to form a 2-scale CDMA encoded chip signal at baseband for up-conversion and transmission.

4. The method of claim 3 further including an encoding implementation, comprising the steps of:

using a fast CDMA chip encoding algorithm to generate the 2-scale CDMA encoded chip signal;

transforming the 2-scale CDMA-encoded chip signal with a fast inverse Fourier transform ($FFT^{-1}$); and after said transforming step, post-summing the 2-scale CDMA chip signal to yield a baseband multi-scale CDMA signal.

5. The method of claims 1 or 2 further including a decoding implementation, comprising the steps of:

decoding signal processing starts with a received 2-scale CDMA encoded chip signal at baseband;

symbol detecting signals in each subband to recover the 2-scale CDMA encoded chips in each subband;

removing the pseudonoise (PN) chip encoding; and performing an inverse 2-scale CDMA decoding to recover the data symbols.

6. The method of claim 5 further including a decoding implementation, comprising the steps of:

pre-summing the received 2-scale CDMA encoded chip signal at baseband;

transforming the pre-summed signal with a fast Fourier transform (FFT) of the pre-summed signal; and after said transforming step, fast CDMA decoding of the chip encoded data symbols including removal of the pseudonoise (PN) chip encoding to yield the transmitted data symbols.

* * * * *